United States Patent
Croswell et al.

(10) Patent No.: US 11,108,430 B1
(45) Date of Patent: Aug. 31, 2021

(54) DEVICE, SYSTEM AND METHOD FOR FREQUENCY HOPPING CONTROL

(71) Applicant: MOTOROLA SOLUTIONS, INC., Chicago, IL (US)

(72) Inventors: Robert T. Croswell, Elgin, IL (US); Bruce D. Mueller, Palatine, IL (US); Rodger W. Caruthers, Des Plaines, IL (US); Duane S. Andres, Schaumburg, IL (US); Randall Brace, Prospect Heights, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/724,733

(22) Filed: Dec. 23, 2019

(51) Int. Cl.
*H04B 1/69* (2011.01)
*H04B 1/707* (2011.01)
*H04B 1/713* (2011.01)
*H04W 72/04* (2009.01)

(52) U.S. Cl.
CPC ........ *H04B 1/713* (2013.01); *H04W 72/0446* (2013.01)

(58) Field of Classification Search
CPC .... H04B 1/713; H04B 1/715; H04W 72/0446
USPC ................................................. 375/132–137
See application file for complete search history.

(56) References Cited

U.S. PATENT DOCUMENTS

| | | | | |
|---|---|---|---|---|
| 5,870,391 A | * | 2/1999 | Nago | H04B 1/713 370/330 |
| 5,937,002 A | | 8/1999 | Andersson et al. | |
| 6,275,518 B1 | * | 8/2001 | Takahashi | H04B 1/715 370/321 |
| 9,537,642 B2 | | 1/2017 | Belghoul et al. | |
| 2002/0039888 A1 | * | 4/2002 | Hama | H04B 1/408 455/67.13 |

FOREIGN PATENT DOCUMENTS

CA    2114570 C    9/1998

* cited by examiner

*Primary Examiner* — Phuong Phu
(74) *Attorney, Agent, or Firm* — Perry + Currier, Inc.

(57) ABSTRACT

A device, system and method for frequency hopping control is provided. The device comprises: a communication unit configured to communicate via main radio channels and a control channel; and a controller interconnected with the communication unit. The controller is configured to: receive, via the communication unit communicating over the control channel, a frequency hopping control command comprising a list of one or more hopping frequencies for frequency hopping; and in response to receiving the frequency hopping control command, control the communication unit to communicate via the main radio channels using frequency hopping according to the one or more hopping frequencies.

16 Claims, 9 Drawing Sheets

DEVICE, SYSTEM AND METHOD FOR FREQUENCY HOPPING CONTROL

BACKGROUND OF THE INVENTION

In mission critical situations, public-safety personnel, and the like, may communicate via radio-enabled devices that operate on given frequencies. The given frequencies may be detected and used by a bad actor to detect the public-safety personnel. Further, a bad-actor may scramble radio channels over which the radio-enabled devices are communicating once they detect the frequencies of the radio channels.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
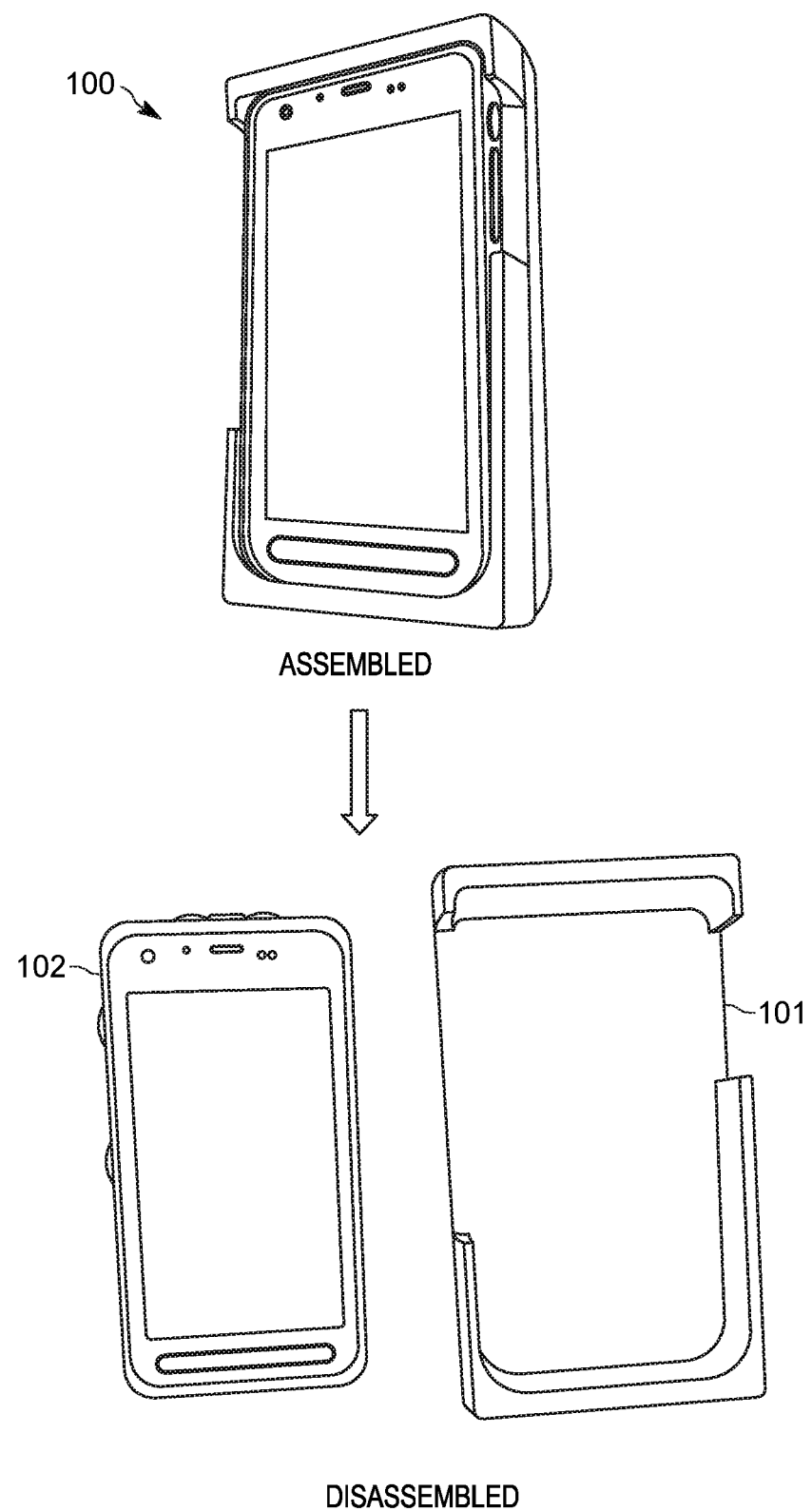
FIG. 1 is a device for frequency hopping control, shown in assembled state and an unassembled state, in accordance with some examples.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

In mission critical situations, public-safety personnel, and the like, may communicate via radio-enabled devices that operate on given frequencies. The given frequencies may be detected and used by a bad actor to detect the public-safety personnel. Further, a bad-actor may scramble radio channels over which the radio-enabled devices are communicating once they detect the frequencies of the radio channels.

Hence, provided herein is a system which includes a system device which communicates with radio devices via main radio channels and a control channel. The main radio channels are used by the radio devices for main communications such as exchanging audio, data, and the like. The control channel may be used by the system device to transmit control commands to the radio devices to control frequencies used by the radio devices, for example according to a frequency hopping scheme.

In some examples, a radio device may include: a commercial-off-the-shelf (COTS) device, and the like, which communicates according to Long-Term Evolution (LTE) standards and radio frequencies, and the like; and a communication device, which may be in the form of a sleeve, and the like, which attaches to the COTS device. The communication device/sleeve acts as an intermediary communication device which communicates with the system device and other radio devices (e.g. communication devices/sleeves at the other radio devices). In particular, the communication device/sleeve translates radio communications (e.g. LTE radio communications) on a frequency band of the COTS device, to frequencies used by the system device and/or the other radio devices and/or the communication devices/sleeves at the other radio devices. The radio communications (e.g. LTE radio communications) of the COTS device are hence not broadcast and/or transmitted, but received at the communication device/sleeve for translation.

While such a scheme may make the radio devices more difficult for a bad actor to locate the devices, to better make the radio devices more difficult to locate, present examples implement a frequency hopping scheme at the communication device/sleeve. For example, computing device at a base station that mediates radio communications between the radio devices may select a frequency hop pattern and transmit a frequency hopping control command to the radio devices. The frequency hopping control command is received at the communication devices/sleeve of the radio devices and may cause the communication devices/sleeves to hop frequencies while the COTS device continues to communicate on a respective fixed frequency band. In this manner a COTS device may be adapted for frequency hopping via the communication device/sleeve.

While present examples are described with respect to a communication device/sleeve and a COTS device, the combined functionality of the COTS device and the communication device/sleeve may be combined into a single device and frequencies thereof may be controlled via the frequency hopping control command.

An aspect of the present specification provides a device comprising: a communication unit configured to communicate via main radio channels and a control channel; and a controller interconnected with the communication unit, the controller configured to: receive, via the communication unit communicating over the control channel, a frequency hopping control command comprising a list of one or more hopping frequencies for frequency hopping; and in response to receiving the frequency hopping control command, control the communication unit to communicate via the main radio channels using frequency hopping according to the one or more hopping frequencies.

Another aspect of the present specification provides a method comprising: receiving, at a device communicating over a control channel, a frequency hopping control command comprising a list of one or more hopping frequencies for frequency hopping, the device configured to communicate over the control channel and main radio channels; and in response to receiving the frequency hopping control command, controlling a communication unit of the device to communicate via the main radio channels using frequency hopping according to the one or more hopping frequencies.

Another aspect of the present specification provides a device comprising: a communication unit configured to communicate with one or more communication devices via at least a control channel, the one or more communication devices communicating via main radio channels; and a controller interconnected with the communication unit, the controller configured to: determine a list of one or more hopping frequencies for frequency hopping; and transmit, via the communication unit communicating over the control channel, to one or more of the communication devices, a frequency hopping control command to cause the one or more communication devices to communicate via the main radio channels using frequency hopping according to the one or more hopping frequencies.

Another aspect of the present specification provides a method comprising: determining, at a computing device, a list of one or more hopping frequencies for frequency hopping; and transmitting, by the computing device communicating over the control channel, to one or more communication devices, a frequency hopping control command to cause the one or more communication devices to communicate via the main radio channels using frequency hopping according to the one or more hopping frequencies.

Attention is directed to FIG. 1, which depicts an example radio device 100 for frequency hopping control, in accordance with some examples. The radio device 100 will interchangeably be referred to hereafter as the device 100 and/or the communication device 100.

As depicted, the device 100 comprises a first communication device 101 and a second communication device 102.

The first communication device 101 is provided in the form of a sleeve, and the like, which mates with and/or assembles with the second communication device 102. For example, the first communication device 101 generally comprises a housing adapted to receive and/or mate with and/or be assembled with a respective housing of the second communication device 102. In particular, FIG. 1 depicts the device 100 in an assembled state (e.g. at the top of FIG. 1) and a disassembled state (e.g. at the bottom of FIG. 1).

The second communication device 102 may be in the form of a commercial-off-the-shelf (COTS) device configured to communicate via a given and/or fixed frequency band, including, but not limited to, a Long-Term Evolution (LTE) frequency band, and the like. However, the second communication device 102 may be configured to communicate using any suitable frequency band and/or frequency bands. While the second communication device 102 is described throughout the present specification with respect to a mobile communication device with a display screen, and the like (e.g. the second communication device 102 may comprise a commercial mobile phone and/or cell phone), the second communication device 102 may comprise a modem module, and the like, without a display screen (e.g. and a terminal device may be attached and/or in communication with such a modem module via a wired communication link (e.g. via a Universal Serial Bus (USB) port, and the like) and/or a local wireless communication (e.g. via Bluetooth™ communication link, a Wi-Fi communication link, a near-field communication (NFC) link, and the like)).

As will be explained hereafter, the first communication device 101 generally translates radio communications of the second communication device 102 between the second communication device 102 and a communication network and/or a base station and/or other radio devices. The first communication device 101 may also be configured to isolate and/or absorb and/or shield RF emissions from the second communication device 102.

For example, the first communication device 101 may be configured to communicate with the communication network and/or a base station and/or other radio devices via one or more frequencies according to a frequency hopping scheme, as described below, and the second communication device 102 may be configured to communicate via at least one given and/or fixed frequency band. The one or more frequencies used by the first communication device 101 are hereafter interchangeably referred to as hopping frequencies.

The first communication device 101 generally converts radio communications between the communication network and the second communication device 102 and in particular the first communication device 101 generally converts radio communications between the hopping frequencies and the given and/or fixed frequency band. In general, the first communication device 101 converts the radio communications without access to the underlying data (e.g. LTE bits) being transmitted, which may be encrypted; rather, the first communication device 101 converts the radio communications between the hopping frequencies and the given and/or fixed frequency band, for example by converting a radio signal between one or more hopping frequencies and one or second frequencies of the given and/or fixed frequency band of the second communication device 102.

Hence, radio communications on radio channels between the communication network and the second communication device 102 are translated between the hopping frequencies and the at least one given and/or fixed frequency band, of the second communication device 102, via the first communication device 101. Hereafter, while reference is made to the second communication device 102 communicating on a given and/or fixed frequency band, it is understood that the second communication device 102 may communicate on more than one given and/or fixed frequency bands.

In general, the device 100 may be provided to a user who may use the device 100 to communicate with other devices, similar to the device 100, over the hopping frequencies, rather than the given and/or fixed frequency band of the first communication device 101, for example to better hide radio communications of the device 100 and/or prevent RF corruption of the radio communications by other signals, for example due to intentional jamming and/or unintentional interference. It is understood that a communication network and/or base station and/or other radio devices with which the device 100 is communicating is adapted to communicate over the hopping frequencies according to a frequency hopping scheme, as described below.

Figure 2:
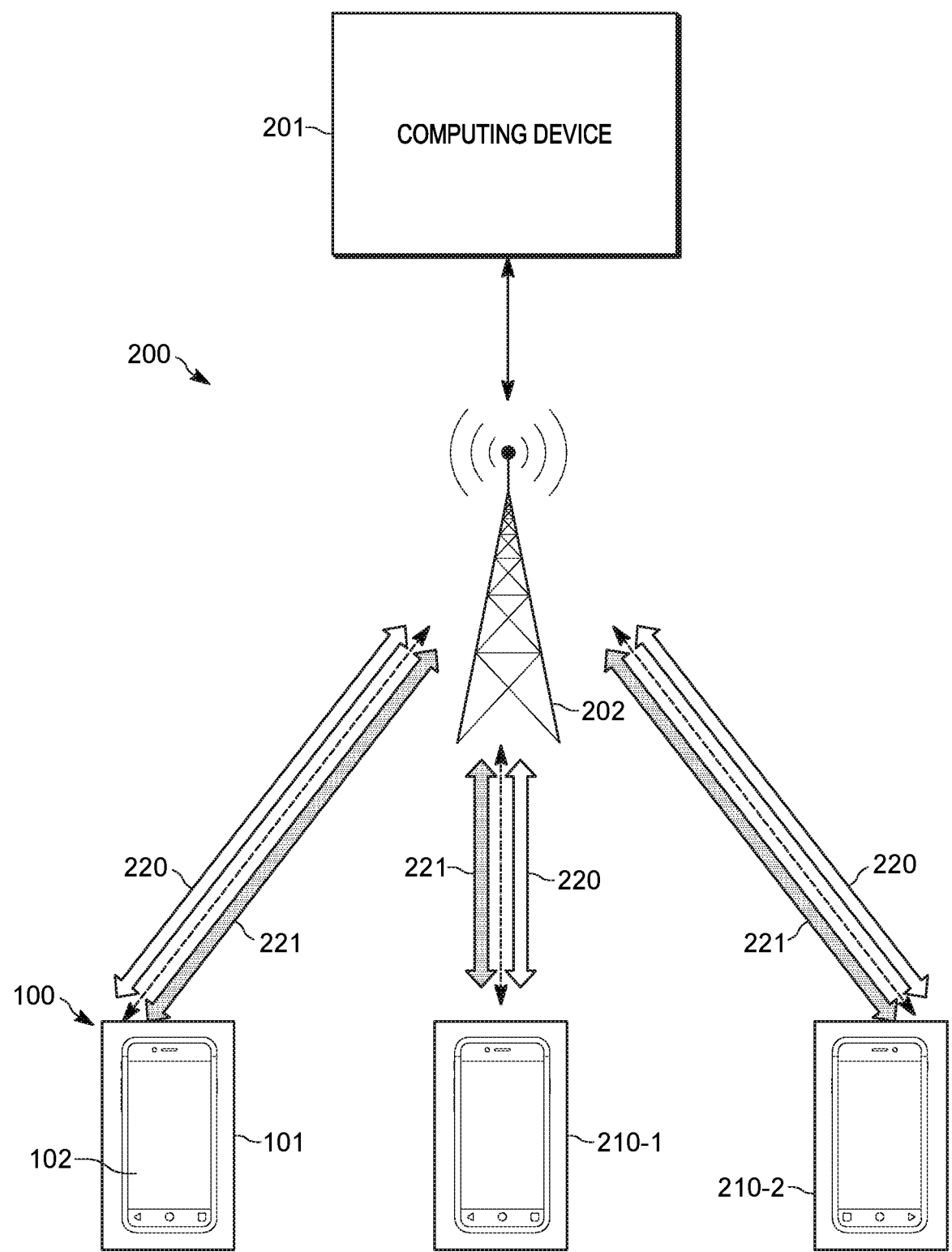
FIG. 2 is a system for frequency hopping control, in accordance with some examples.

For example, attention is next directed to FIG. 2 which depicts a system 200 in which the device 100 is deployed. As depicted, the system 200 comprises the device 100 and computing device 201 in communication with a base station 202. In some examples, the computing device 201 may be separate from the base station 202, while in other examples, the computing device 201 may be integrated with the base station 202. The system 200 further comprises one or more further radio devices 210-1, 210-2, each of which may be similar to the device 100. The radio devices 210-1, 210-2 are interchangeably referred to hereafter, collectively, as the devices 210 and/or the communication devices 210, and generically, as a device 210 and/or a communication device 210. While two devices 210 are depicted, the system 200 may comprise as few as one device 210 or more than two devices 210.

Regardless, the devices 100, 210 wirelessly communicate with each other via the base station 202, for example via wireless communication links over hopping frequencies, according to a frequency hopping scheme, as described below. Communication links between components of the system 200 are depicted in FIG. 2, and throughout the present specification, as double-ended arrows between respective components; the communication links may include any suitable combination of wireless and/or wired links and/or wireless and/or wired communication networks. Hence, the base station 202 is generally representative of a communication network over which the devices 100, 210 communicate.

The base station 202 may comprise a combination of one or more antennas and one or more transceivers. Furthermore while only one base station 202 is depicted, it is understood that the system 200 may comprise a plurality of base stations 202 providing wireless communications between the devices 100, 210. Furthermore, while the base station 202 is depicted as an antenna, the base station 202 may comprise a base station controller and/or a base station unit and/or a radio network controller and/or, when the base station 202 is configured for LTE communications, an eNode B device and/or an Enhanced Packet Core (EPC) device (e.g. which may control a plurality of base stations 202 and/or eNode B devices); such devices are generically referred to hereafter as communications control units. Transceivers of the base station 202 may be components of a communication control unit thereof. Furthermore, the computing device 201 may be in communication with more than one base station and/or more than one eNode B devices, and the like, and/or the computing device 201 may be located at an EPC device, and the like.

In some examples, the computing device 201 may be in the form of a device which attaches and/or plugs into a communication control unit of the base station 202, for example to adapt the base station 202 to communicate over hopping frequencies, according to a frequency hopping scheme, as described below. The base station 202 may otherwise be for communicating over a given and/or fixed frequency bandwidth, for example LTE frequency bandwidths via the communications control unit.

As depicted, the devices 100, 210 communicate with each other and/or the computing device 201 via main radio channels 220 and a control channel 221, for example via communication links with the base station 202 and the hopping frequencies. In some examples, communication on the control channel 221 may be unidirectional from the computing device 201 to the devices 100, 210; however, in other examples, limited communication between the devices 201, 100, 210 may occur via the control channel 221.

Communications between the devices 100, 210 generally occur over the main radio channels 220. For example, the devices 100, 210 may exchange messages, phone calls, data, and the like over the main radio channels 220. The control channel 221, however, may be reserved for control commands from the computing device 201 to the devices 100, 210, as described in more detail below, though the devices 100, 210 may communicate with the computing device 201 via the control channel 221.

In some examples, communications between the devices 100, 210 via the main radio channels 220 may be via the computing device 201 and/or the computing device 201 may be configured to communicate via the main radio channels 220, as well as the control channel 221.

Aspects of a frequency hopping scheme used in the system 200 are now described. While frequency hopping may occur within the LTE standard (e.g. according to frequency-hopping spread spectrum (FHSS) and the like), and specifically within an LTE frequency band in which frequency hopping occurs in a well-defined and/or predetermined order which is easy to detect, the frequency hopping scheme, as described herein, is different from such FHSS frequency hopping. For example, the frequency hopping scheme, as described herein is not restricted to commercially defined bandwidths and further includes a control channel for controlling frequency hopping, which may be random. In other words, the frequency hopping scheme as described herein does not occur in predetermined order.

For example, the computing device 201 may cause the base station 202 to scan and/or periodically scan for unused and/or open and/or unoccupied frequencies, and/or unused and/or open and/or unoccupied frequency bands, a range of frequencies which may or may not include the frequency band used by the second communication device 102 (e.g. an LTE frequency band). Such unused frequencies are used to generate a list of one or more hopping frequencies for frequency hopping. For example, the computing device 201 may randomly select hopping frequencies from the unused and/or open frequencies, and/or unused and/or open frequency bands found during a scan thereof.

Indeed, in some examples, the computing device 201 may specifically exclude commercial frequency bands from the list as radio communications in such commercial frequency bands (e.g. an LTE frequency band) may be a frequency region that a bad actor may search for radio communications between the devices 100, 210. Furthermore, the computing device 201 may store and/or have access to a black list of frequencies which are not to be used for the list of one or more hopping frequencies, and/or scanned. Similarly, the computing device 201 may store and/or have access to a white list of frequencies which may be used for the list of one or more hopping frequencies, and/or scanned. The black list may include commercial frequency bands, Global Positioning System (GPS) bands, and the like. The white list may include any frequencies and/or frequency bands not associated with commercial frequency bands, and the like.

Hence, in general, the main radio channels 220 are controlled to frequency hop on one or more hopping frequencies, which may be randomly selected by the computing device 201 and/or may be randomly changed by the computing device 201. As will be explained in further detail below, in some examples, computing device 201 may perform frequency scans via the base station 202 to determine available and/or unoccupied frequencies from which to randomly select.

Alternatively, or additionally, the devices 100, 210 may perform frequency scanning to determine available frequencies and provide indications of such frequency scanning to the computing device 101 to assist the computing device 201 with determining available frequencies and/or unoccupied from which to randomly select (e.g. as, in some examples, the devices 100, 210 may detect communications signals on occupied frequencies (e.g. frequencies on which data is being transmitted by devices other than the devices 100, 210, 201) that may not be detected by the base station 202 and/or at the location of the base station 202. Regardless, the computing device 201 may generate and/or periodically generate and/or randomly generate the list of one or more hopping frequencies for frequency hopping and transmit the list to the devices 100, 210 on the control channel 221. The devices 100, 210 receive the list on the control channel 221 and thereafter communicate via the hopping frequencies, which change according to a schedule which may also be included with the list. In some examples, the computing device 201 may also communicate with the devices 100, 210 via the hopping frequencies according to the list. Regardless, the devices 100, 210 generally communicate over the main radio channels 220, and frequency hop according to the list.

The list may generally include a schedule for the frequency hopping including, but not limited to, one or more time periods that the components of the system 200 may communicate on a hopping frequency; the one or more time periods may be the same and/or different for each of the hopping frequencies on the list; in other words, components of the system 200 may communicate on a first hopping frequency for a first given time period and may communicate on a second hopping frequency when the given time period expires; a second given time period that the system 200 communicates on the second hopping frequency may be the same as, or different from, the first given time period.

In general, the list of the one or more hopping frequencies for frequency hopping is transmitted on the control channel 221, which may also be controlled to frequency hop, as will be described in more detail below.

Indeed, it is understood that devices 100, 210, 201 may communicate using frequency division duplexing (FDD) or time division duplexing (TDD), and the frequency hopping may occur within a framework of FDD or TDD. For example, in FDD, bidirectional communications may occur on main radio channels 220 on two separate frequencies (e.g. one frequency for uplink communications and another frequency for downlink communications), while in TDD bidirectional communications may occur on main radio channels 220 on same frequencies (e.g. uplink and downlink communications on the radio channels 220 are transmitted on the same frequency in different time segments). Hence, the frequency hopping may occur in the context of FDD such that the two separate frequencies frequency hop, or the frequency hopping may occur in the context of TDD such that a common frequency used for uplink and downlink communications frequency hops.

When a device 100, 210 initiates and/or is turned on, rebooted, and the like, the device 100, 210 generally initiates communication with the control channel 221, for example using synchronization process and/or a rendezvous process. Once communication is initiated, the device 100, 210 may thereafter receive the frequency hopping control command. Furthermore, the control channel 221 may also frequency hop and/or be provided in a manner to hide the control channel 221 (e.g. from a bad actor), using any suitable process such as Direct Sequence Spread Spectrum (DSSS), described in more detail below. Hence, initiating communications with the control channel 221 may present particular challenges. Examples of initiating communication with the control channel are described in more detail below with respect to FIG. 5.

Figure 3:
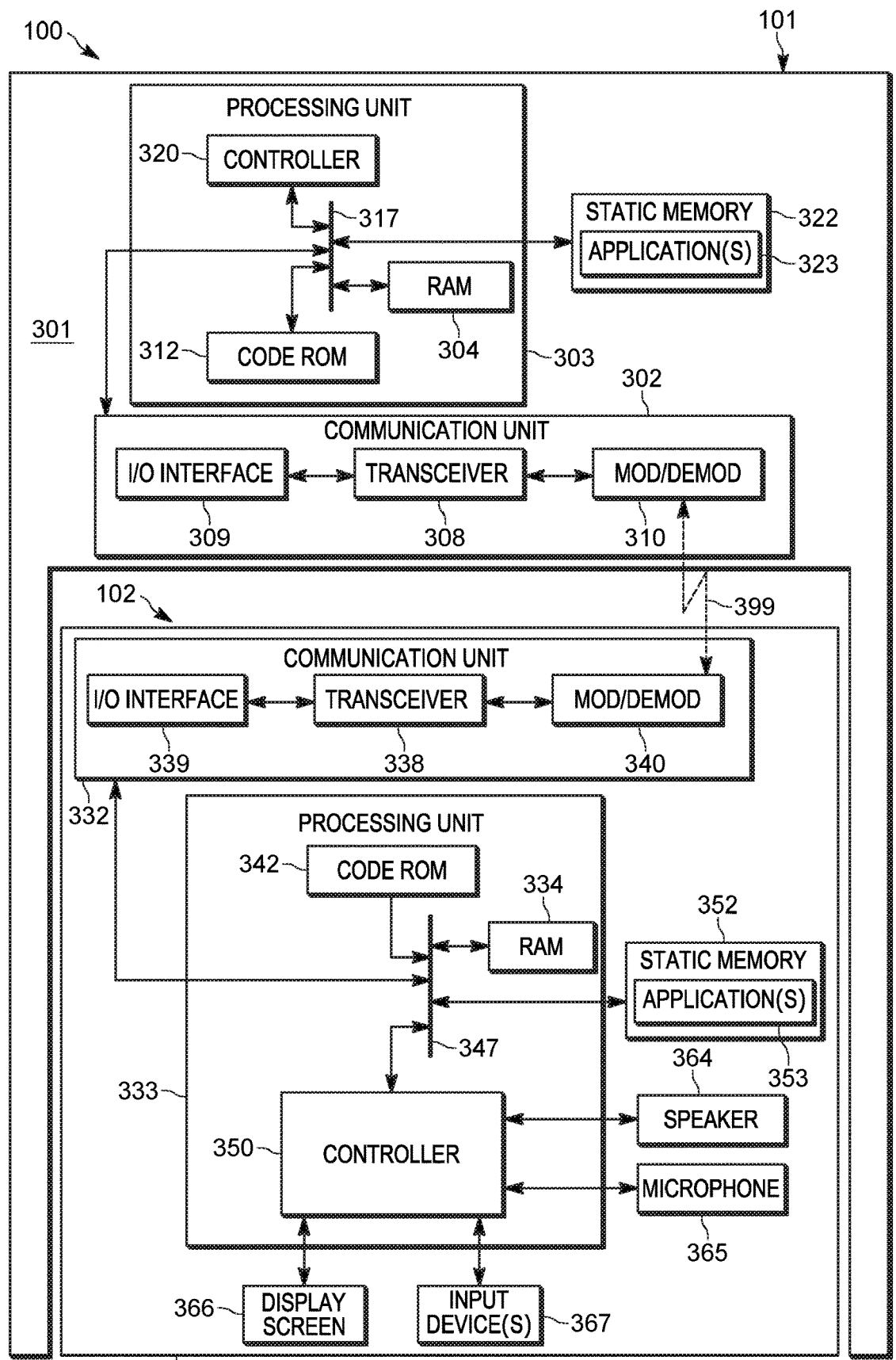
FIG. 3 is a device diagram showing a device structure of a radio device for frequency hopping control, in accordance with some examples.

Attention is next directed to FIG. 3, which depicts a schematic block diagram of an example of the device 100.

In general, the device 100 may comprise the first communication device 101 and the second communication device 102. As depicted in FIG. 3, the first communication device 101 and the second communication device 102 are in the assembled state, similar to the assembled state depicted in FIG. 1. Furthermore, the computing devices 210 may have a configuration similar to the device 100, as shown in FIG. 3.

As depicted, the first communication device 101 comprises: a housing 301, a communication unit 302, a processing unit 303, a Random-Access Memory (RAM) 304, one or more wireless transceivers 308, one or more wired and/or wireless input/output (I/O) interfaces 309, a combined modulator/demodulator 310 (the transceiver(s) 308 coupled to the combined modulator/demodulator 310 and the I/O interfaces 309), a code Read Only Memory (ROM) 312, a common data and address bus 317, a controller 320, and a static memory 322 storing at least one application 323. Hereafter, the at least one application 323 will be interchangeably referred to as the application 323.

Furthermore, each of the memories 312, 322 comprise non-transitory memories and/or non-transitory computer readable mediums.

As depicted, the second communication device 102 comprises: a housing 331, a communication unit 332, a processing unit 333, a RAM 334, one or more wireless transceivers 338, one or more wired and/or I/O interfaces 339, a combined modulator/demodulator 340 (the transceiver(s) 338 coupled to the combined modulator/demodulator 340 and the I/O interfaces 339), a code ROM 342, a common data and address bus 347, a controller 350, and a static memory 352 storing at least one application 353. Hereafter, the at least one application 353 will be interchangeably referred to as the application 353.

Furthermore, each of the memories 342, 352 comprise non-transitory memories and/or non-transitory computer readable mediums.

As depicted, the second communication device 102 further comprises a speaker 364, a microphone 365, a display screen 366, and one or more input devices 367 (e.g. a keyboard, a touch screen (e.g. of the display screen 366, buttons, knobs, pointing devices and the like), and/or any other components which enable a user to operate the second communication device 102, for example coupled to the controller 350 and/or the common data and address bus 347.

In some examples, as depicted, the devices 101, 102 are configured such that, when the devices 101, 102 are mated and/or assembled, the communication units 302, 332 and/or antennas thereof, align to assist in wireless communications therebetween; however, the devices 101, 102 may have any suitable configuration such that, when the devices 101, 102 are mated and/or assembled, the communication units 302, 332 wirelessly communicate, as described above.

For example, as depicted, the communication units 302, 332 are about aligned such that the communication units may wirelessly communicate. Furthermore, the housing 301 of the first communication device 101 receives the housing 331 of the second communication device 101 and may isolate and/or absorb and/or shield the communication unit 332 from communicating with the base station 202 and/or other base stations and/or communication networks.

Rather, wireless transmissions of the communication unit 332, in a frequency band of the second communication device 102, are received at the communication unit 302, and translated to one or more of the hopping frequencies, and are broadcast and/or transmitted over the hopping frequencies, for example to the base station 202. Similarly, wireless transmissions received at the communication unit 302 (e.g. from the base station 202) are received at over the hopping frequencies, translated to the frequency band of the second communication device 102, and transmitted to the communication unit 332. Hence, from the viewpoint of the communication unit 332 and/or the second communication device 102, wireless communications are occurring via the frequency band thereof.

In some examples, the controllers 320, 350 may be interconnected and/or in communication with each other when the devices 101, 102 are assembled. For example, the controllers 320, 350 may be in wired communication via connectors of the devices 101, 102, and/or the controllers 320, 350 may be in wireless communication via the communication units 302, 332 of the devices 101, 102.

As shown in FIG. 3, the communication unit 302 is coupled to the common data and address bus 317 of the processing unit 303, and the communication unit 332 is coupled to the common data and address bus 347 of the processing unit 343.

The respective processing units 303, 333 may include a respective code ROM 312, 342 coupled to a respective common data and address bus 317, 347 for storing data for initializing respective device components. Respective processing units 303, 333 may further include respective controllers 320, 350 coupled, by respective common data and address buses 317, 347 to respective RAM 304, 334 and respective static memory 322, 352.

The communication units 302, 332 may include respective transceivers 308, 338 adapted for wireless communication with each other, as described above. For example, as depicted, a communication link 399 may be established between the combined modulators/demodulators 310, 340 (e.g. via respective antennas (not depicted) of the communication units 302, 304); while the communication link 399 is depicted in dashed lines to indicate a wireless communication link that may be established when the device 100 is "on" and/or operational (e.g. and which may not be present when the device 100 is "off" and/or non-operational), the communication link 399 may alternatively comprise a wired link between the devices 101, 102.

For example, the communication unit 332 and/or the transceiver 338 may be configured to communicate via a given and/or fixed frequency band, including, but not limited to, a frequency band of an LTE network, and/or any other suitable network, including but not limited to, one or more of: a Bluetooth network, a Wi-Fi network, for example operating in accordance with an IEEE 802.11 standard (e.g., 802.11a, 802.11b, 802.11ga Worldwide Interoperability for Microwave Access (WiMAX) network, for example operating in accordance with an IEEE 802.16 standard, and/or another similar type of wireless network, and the like, such as cellular networks including the aforementioned LTE network and/or other types of 3rd Generation Partnership Project networks (3GPPP) (e.g. such as Global System for Mobile (GSM) communications networks, Universal Mobile Telecommunications Service (UMTS) networks, and the like), 5G ($5^{th}$ Generation) networks (e.g. a network architecture compliant with, for example, the 3GPP TS 23 specification series and/or a new radio (NR) air interface compliant with the 3GPP TS 38 specification series) standard), and the like. Indeed, the communication unit 332 and/or the transceiver 338 may be configured to communicate over a commercial network.

However, the communication unit 332 and/or the transceiver 338 may be configured to communicate via a frequency band of networks dedicated for use by first responders including, but not limited to one or more of a digital mobile radio (DMR) network, a Project 25 (P25) network, and a terrestrial trunked radio (TETRA) network.

In contrast, the communication unit 302 and/or the transceiver 308 are configured to communicate with the communication unit 332 and/or the transceiver 338 via a frequency band thereof, and the communication unit 302 and/or the transceiver 308 are further configured to communicate via the hopping frequencies as described above, for example according to the frequency hopping scheme described herein. In general, a respective bandwidth within which the hopping frequencies are located may be larger than the frequency bandwidth of the communication unit 332 and/or the transceiver 338.

The communication units 302, 332 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controllers 320, 350 may include ports (e.g. hardware ports) for coupling to other hardware components. For example, the controller 350 may include ports for coupling to the speaker 364, the microphone 365, the display screen 366 and the one or more input devices 367.

The controllers 320, 350 includes one or more logic circuits, one or more processors, one or more microprocessors, one or more ASIC (application-specific integrated circuits) and one or more FPGA (field-programmable gate arrays), and/or another electronic device adapted for the respective functionality of the devices 101, 102.

The static memories 322, 352 are non-transitory machine readable media that stores respective machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 3, programming instructions (e.g., machine readable instructions) that implement the functional teachings of the device 100 as described herein are maintained, persistently, at the memories 322, 352 and used by the controllers 320, 350, which makes appropriate utilization of volatile storage during the execution of such programming instructions.

For example, the memory 352 stores instructions corresponding to the at least one application 353 that, when executed by the controller 350, enables a user of the device 100 to interact with the second communication device 102 as an interface of the device 100 to send/receive audio, messages, data and the like. Indeed, the at least one application 353, when executed by the controller 350, generally enables the second communication device 102 to function as a mobile device.

Figure 5:
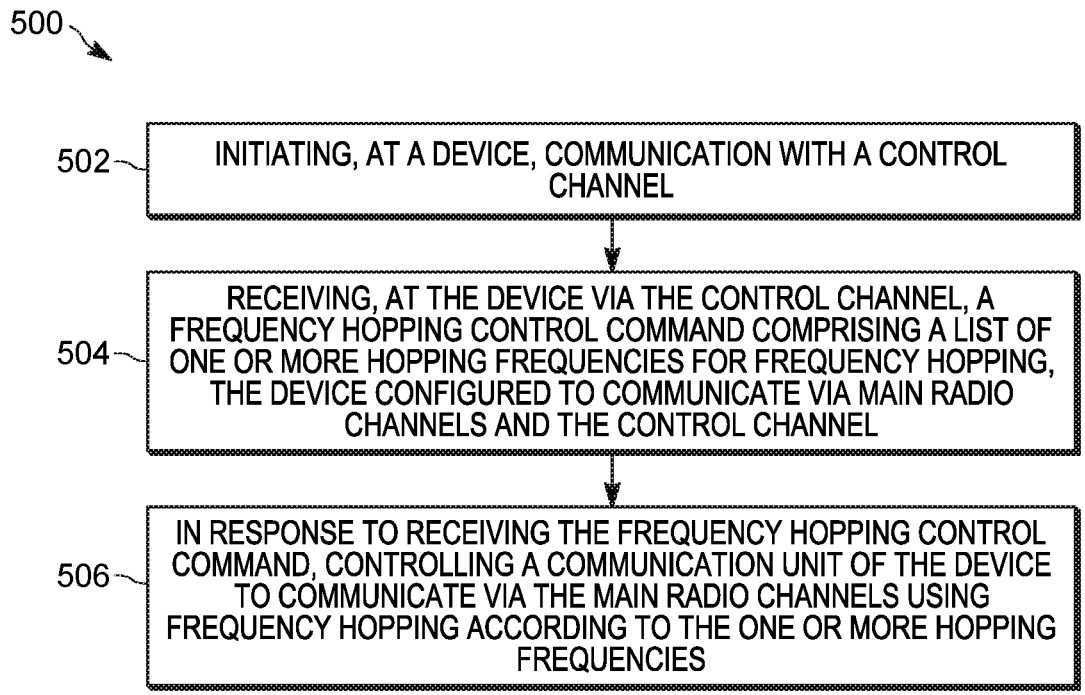
FIG. 5 is a flowchart of a method for frequency hopping control, in accordance with some examples.

However, the memory 322 stores instructions corresponding to the at least one application 323 that, when executed by the controller 320, enables the controller 320 to implement functionality for frequency hopping control including, but not limited to, the blocks of the method 500 set forth in FIG. 5.

Indeed, in some examples, the controller 320 and/or the first communication device 101 is not a generic controller and/or a generic device, but a controller and/or device specifically configured to implement functionality for frequency hopping control. For example, in some examples, the controller 320 and/or the first communication device 101 may specifically comprises a computer executable engine configured to implement functionality for frequency hopping control.

In illustrated examples, when the controller 320 executes the one or more applications 323, the controller 320 is enabled to: initiate, via the communication unit 302, communication with the control channel 221; receive, via the communication unit 302 communicating over the control channel 221, a frequency hopping control command comprising a list of one or more hopping frequencies for frequency hopping; and in response to receiving the frequency hopping control command, control the communication unit 302 to communicate via the main radio channels 221 using frequency hopping according to the one or more hopping frequencies.

Figure 4:
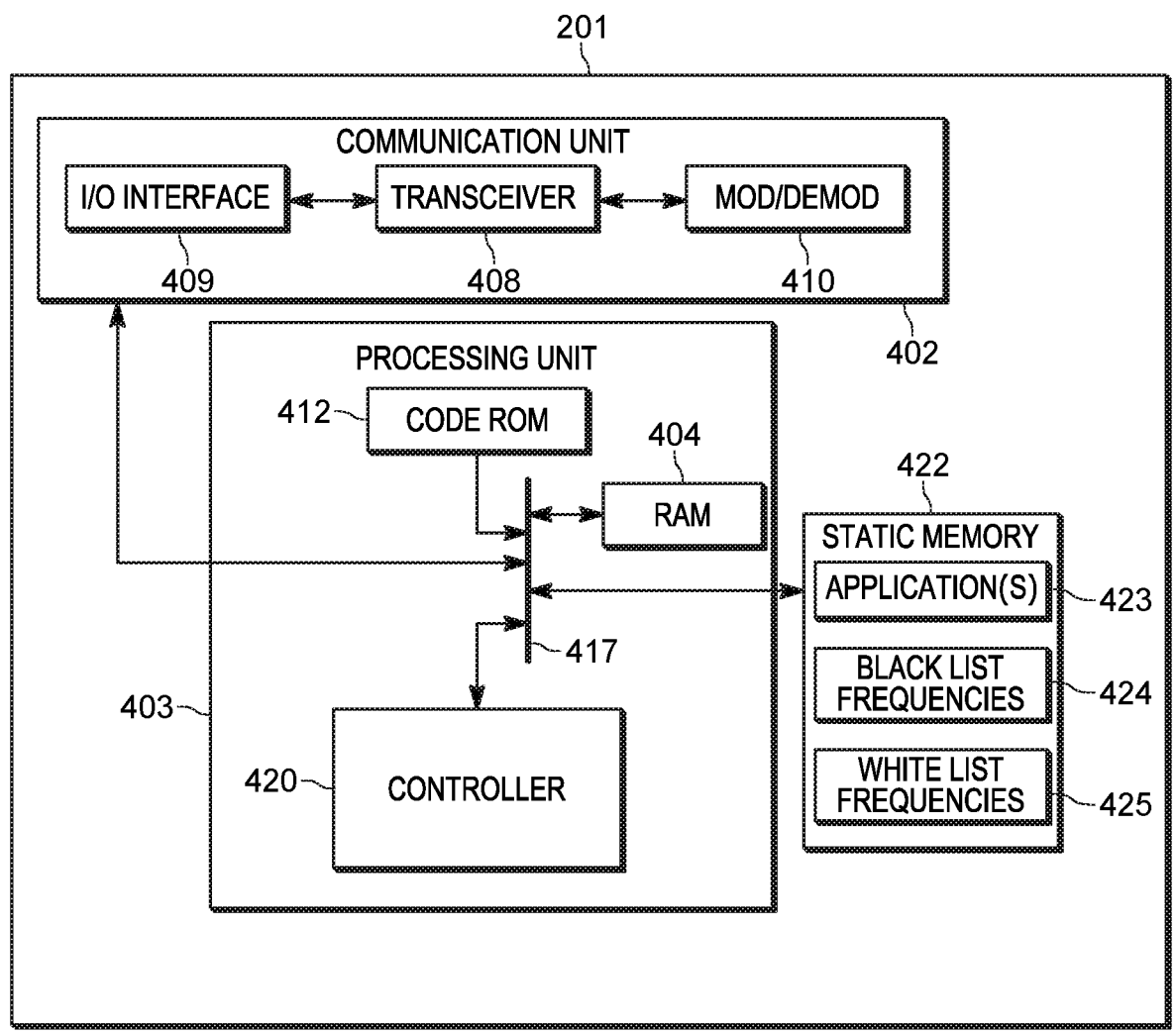
FIG. 4 is a device diagram showing a device structure of a computing device for controlling frequency hopping at radio devices, in accordance with some examples.

Attention is next directed to FIG. 4, which depicts a schematic block diagram of an example of the computing device 201. In general, the device 201 may comprise a cloud computing device and/or a server and/or a device which plugs into a communication control unit of the base station 202 to adapt the base station 202 and/or the devices 100, 210 to communicate via over hopping frequencies via the main radio channels 220 and the control channel 221.

As depicted, the computing device 201 comprises: a communication unit 402, a processing unit 403, a Random-Access Memory (RAM) 404, one or more wireless transceivers 408, one or more wired and/or wireless I/O interfaces 409, a combined modulator/demodulator 410 (the transceiver(s) 408 coupled to the combined modulator/demodulator 410 and the I/O interfaces 409), a code ROM 412, a common data and address bus 417, a controller 420, and a static memory 422 storing at least one application 423. Hereafter, the at least one application 423 will be interchangeably referred to as the application 423. Furthermore, each of the memories 412, 422 comprise non-transitory memories and/or non-transitory computer readable mediums.

As depicted, the memory 422 further stores a black list 424 of black-listed frequencies and a white list 425 of white-listed frequencies, as described above. The lists 424, 425 may be predetermined and provisioned at the memory 422 prior to the computing device 201 being deployed and/or periodically updated via a backhaul of the base station 202, and the like. The respective frequencies on the lists 424, 425 may be provided in the form of respective frequency bandwidths; for example, the black list 424 of black-listed frequencies may comprise frequency bands that may not be scanned when scanning for unused and/or unoccupied frequencies, and the white list 425 of white-listed frequencies may comprise frequency bands that may be scanned when scanning for unused and/or unoccupied frequencies.

While not depicted, the computing device 201 may further comprise one or more input devices, a display screen and/or the like and/or any components which enable a user to interact with the computing device 201, though a user may interact with the computing device 201 via external input devices, display screens, and the like. For example, a user operating a device at a control and command center may interact remotely with the computing device 201 via a backhaul of the base station 202.

The communication unit 402 is coupled to the common data and address bus 417 of the processing unit 403. The processing unit 403 may include the code ROM 412 coupled the common data and address bus 417 for storing data for initializing respective device components. The processing unit 403 may further include the controller 420 coupled, by respective common data and address buses 417, to the RAM 304 and the static memory 422.

The communication unit 402 and/or the transceiver 408 are configured to communicate with the devices 100, 210 via frequencies of the control channel 221. In some examples, the communication unit 402 and/or the transceiver 408 may be further configured to communicate with the devices 100, 210 via the hopping frequencies of the main radio channels 220. Indeed, radio communication between the devices 100, 210 via the hopping frequencies may be facilitated by communication unit 402 and/or the transceiver 408.

The communication units 402 may optionally include one or more wireline transceivers, such as an Ethernet transceiver, a USB (Universal Serial Bus) transceiver, or similar transceiver configurable to communicate via a twisted pair wire, a coaxial cable, a fiber-optic link, or a similar physical connection to a wireline network.

The controller 420 may include ports (e.g. hardware ports) for coupling to other hardware components.

The controller 420 includes one or more logic circuits, one or more processors, one or more microprocessors, one or more ASIC (application-specific integrated circuits) and one or more FPGA (field-programmable gate arrays), and/or another electronic device adapted for the functionality of the computing device 201. Indeed, in some examples, the controller 420 and/or the computing device 201 is not a generic controller and/or a generic device, but a controller and/or a device specifically configured to implement functionality for controlling hopping frequencies of the devices 100, 210, and the like. For example, in some examples, the controller 320 and/or the first communication device 101 may specifically comprises a computer executable engine configured to implement functionality for controlling hopping frequencies of the devices 100, 210, and the like.

The static memory 422 is non-transitory machine readable medium that stores respective machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 4, programming instructions (e.g., machine readable instructions) that implement the functional teachings of computing device 201 as described herein are maintained, persistently, at the memory 422 and used by the controller 420 which makes appropriate utilization of volatile storage during the execution of such programming instructions.

Figure 6:
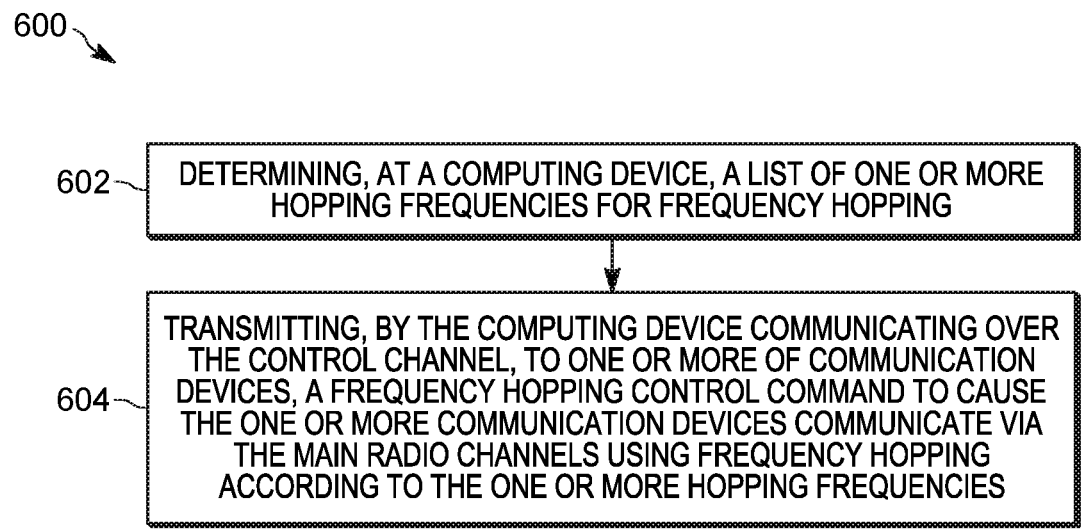
FIG. 6 is a flowchart of a method for controlling frequency hopping at radio devices, in accordance with some examples.

However, the memory 422 stores instructions corresponding to the at least one application 423 that, when executed by the controller 420, enables the controller 420 to implement functionality for controlling hopping frequencies of the devices 100, 210, and the like including, but not limited to, the blocks of the method 600 set forth in FIG. 6.

In illustrated examples, when the controller 420 executes the one or more applications 423, the controller 420 is enabled to: determine a list of one or more hopping frequencies for frequency hopping; and transmit, via the communication unit 402 communicating over the control channel, to one or more of the communication devices 100, 210, a frequency hopping control command to cause the one or more communication devices 100, 210 to communicate via the main radio channels 220 using frequency hopping according to the one or more hopping frequencies.

Attention is now directed to FIG. 5, which depicts a flowchart representative of a method 500 for frequency hopping control. The operations of the method 500 of FIG. 5 correspond to machine readable instructions that are executed by the device 100 (and/or the devices 210), and specifically by the controller 320 of the first communication device 101 of the device 100. In the illustrated example, the instructions represented by the blocks of FIG. 5 are stored at the memory 322 for example, as the application 323. The method 500 of FIG. 5 is one way in which the controller 320 and/or the first communication device 101 and/or the device 100 and/or the system 200 may be configured. Furthermore, the following discussion of the method 500 of FIG. 5 will lead to a further understanding of the system 200, and its various components. However, it is to be understood that the method 500 and/or the system 200 may be varied, and need not work exactly as discussed herein in conjunction with each other, and that such variations are within the scope of present examples.

The method 500 of FIG. 5 need not be performed in the exact sequence as shown and likewise various blocks may be performed in parallel rather than in sequence. Accordingly, the elements of method 500 are referred to herein as "blocks" rather than "steps." The method 500 of FIG. 5 may be implemented on variations of the system 200, as well. For example, the method 500 may be implemented by a single device that includes the combined functionality of the devices 101, 102 (e.g. such a single device generally configured to wirelessly communicate over the hopping frequencies and the control channel 221). In other words, the method 500 may be implemented in a device that does not include a sleeve similar to the first communication device 101, but rather the method 500 may be implemented in any suitable mobile, or fixed, communication device, and the like (e.g. similar to the second communication device 102); indeed, in some examples, the method 500 may be implemented at the second communication device 102 without the first communication device 101. It is yet further understood that the method 500 may generally performed by the devices 210, in addition to the device 100, such that the devices 100, 210 may communicate via hopping frequencies.

At a block 502, the controller 320 and/or the first communication device 101 and/or the device 100 initiates communication with the control channel 221.

In general, when a device 100, 210 is initiated, the device 100, 210 must generally first find the control channel 221 (e.g. at the block 502) to receive the list of hopping frequencies before communication may occur over the hopping frequencies on the main radio channels 220. A process for initiating communication with the control channel 221 generally depends on how the computing device 201 has been provisioned to provide the control channel 221.

For example, the control channel 221 may comprise one or more channels of the main radio channels 220 (e.g. a channel of the main radio channels 220 reserved for control commands) and/or the control channel 221 may be different from the main radio channels 220 and/or the control channel 221 may comprise one or more side channels to the main radio channels 220.

Furthermore, in some of these examples, the control channel 220 may be controlled to frequency hop in tandem with and/or different from frequency hopping of the main radio channels 221. In other examples the control channel 220 may be at one or more fixed frequencies and/or may rotate and/or cycle through a plurality of fixed frequencies (e.g. according to a schedule).

In examples, where the control channel 221 is at a fixed frequency and/or rotates and/or cycles through a plurality of fixed frequencies (e.g. according to a schedule), the controller 320 and/or the first communication device 101 and/or the device 100 may be configured to communicate on the fixed frequencies and/or scan the transceiver 308 of the communication unit 302 through the plurality of fixed frequencies to search for the control channel 221. In other words, a list of frequencies and/or plurality of fixed frequencies of the control channel 221 may be preconfigured at the device 100 and/or stored at the memory 322 such that the controller 320 and/or the first communication device 101 and/or the device 100 may scan therethrough.

However, the control channel 221 may frequency hop (e.g. randomly) through a plurality of frequencies. In some of these examples the control channel 221 may frequency hop in one or more fixed frequency bands and the controller 320 and/or the first communication device 101 and/or the device 100 may be configured to scan through the one or more fixed frequency bands to search for the control channel 221. In other words a list of the one or more fixed frequency bands of the control channel 221 may be preconfigured at the device 100 and/or stored at the memory 322 such that the controller 320 and/or the first communication device 101 and/or the device 100 may scan therethrough.

In other examples, when the control channel 221 frequency hops and/or rotates and/or cycles through a plurality of frequencies, the frequencies through which the control channel 221 hops and/or rotates and/or cycles may be not be predetermined and/or not preconfigured at the device 210.

Hence, in some examples, the computing device 201 may transmit one or more schedules of the frequencies through which the control channel 221 hops and/or rotates and/or cycles, to the devices 100 via a beacon of the base station 202, such that the device 100 may initiate communication with the control channel 221 via the one or more schedules received via the beacon. Such a beacon may comprise a radio communication broadcast, for example at a fixed frequency and/or frequencies, and the like, with a list of the fixed frequency and/or frequencies provisioned at the memory 322. Information broadcast via the beacon may be encrypted. Indeed, any data exchanged between the computing device 201, the device 100 and the devices 201 may be encrypted and, in such examples, the computing device 201 and the device 100 are provisioned with respective suitable cryptographic algorithms for encrypting and/or decrypting data.

Once communication on the control channel 221 is established, the computing device 201 may transmit a schedule of the of the frequencies through which the control channel 221 hops and/or rotates and/or cycles, to the devices 100 via the control channel 221. Such frequency hopping may or may not occur in tandem with the main radio channels 221. In other words, in some examples, the schedule of the of the frequencies through which the control channel 221 hops may comprise the frequency hopping control command described herein.

In specific examples, the control channel 221 and/or the beacon may be provided using a low bitrate direct-sequence spread spectrum (DSSS) such that a coded sequence of the control channel 221 and/or the beacon (e.g. which may include a schedule of the frequencies through which the control channel 221 hops) is spread over various frequencies at low transmit powers which may not be distinguishable from noise to a radio device of a bad actor. In these examples, the controller 302, the first communication device 101 and/or the device 100 may be configured to receive the coded sequence using DSSS. The bandwidth used for the DSSS may be in any suitable frequency bandwidth on which the first communication device 101 is enabled to communicate, and which may include commercially defined bandwidths (e.g. LTE bandwidths).

In yet further examples, the computing device 201 may control the base station 202 to transmit synchronization indications (e.g. synchronization "pulses" carrying any suitable data) to provide one or more reference times which may be used by the device 100 to synchronize with frequencies through which the control channel 221 hops and/or rotates and/or cycles.

Similarly, on some examples, once communication on the control channel 221 is established, synchronization indications may be received via the control channel 221 to provide a synchronization pulse for synchronizing with the hopping frequencies. Put another way, the synchronization indications may also be used by the device 100 to synchronize to a schedule of hopping frequencies in the list of hopping frequencies through which the main radio channels 220 frequency hop, as described herein.

The synchronization indications may be transmitted using the beacon.

Furthermore, the synchronization indications may be provided in the form of cyclic prefixes (e.g. LTE-type cyclic prefixes), for example added to data transmitted on the main radio channels 220, and which may be decoded by the first communication device 101, and/or decoded by the second communication device 102 and provided to the first communication device 101 via the devices 101, 102 communicating. Put another way, the first communication device 101 may perform a cyclic prefix search and/or an LTE-type cyclic prefix search to search for cyclic prefixes and/or LTE cyclic prefixes that have been included on data transmitted on the main radio channels 220 to maintain synchronization with the control channel 221.

In yet further examples, frequencies of the control channel 221 and/or a schedule thereof, may be determined at the devices 100, 210 via a common algorithm, and the device 100 may synchronize with such determined frequencies via a synchronization indication.

In examples where the frequencies of the control channel 221 are fixed, the computing device 201 may not transmit the synchronization indications and/or any data on the beacon. For example, the controller 320 and/or the first communication device 101 and/or the device 100 may search for the control channel 221 among the fixed frequencies. In some examples, the computing device 201 may not transmit the synchronization indications on fixed frequencies that are occupied; rather, another available fixed frequency is selected for transmission of the synchronization indications.

In some examples, the control channel 221 may comprise one or more of a broadcast only channel and/or a downlink only channel; in other words, in these examples, the controller 302 and/or the first communication device 101 and/or the device 100 may be configured to receive data (e.g. the frequency hopping control command) on the control channel 221, but may not transmit data on the control channel 221.

However, in other examples, the controller 302 and/or the first communication device 101 and/or the device 100 may be configured to transmit data on the control channel 221 as well as received data. In some of these examples, the controller 302 and/or the first communication device 101 and/or the device 100 may be configured to transmit data on the control channel 221 in a restricted manner. For example, the controller 302 and/or the first communication device 101 and/or the device 100 may be configured to transmit data on the control channel 221 but only certain types of data and/or only at a given data rate (and/or less than the given data rate). For example, in some examples only text messages, and the like may be transmitted on the control channel 221, for example as a backup "uplink" channel which may be used in addition to the main radio channels 220 and/or when problems are encountered on the main radio channels 220.

In other specific examples, the control channel 221 may be provided adjacent hopping frequencies of the main radio control channels 220 such that the control channel 221 hops with the main radio control channels 220. In other examples, the control channel 221 may be provided on two or more frequencies on either side of the hopping frequencies of the main radio control channels 220 such that the control channel 221 hops with the main radio control channels 220.

In examples where the computing device 201 performs scans to determine occupied and/or unoccupied frequencies, the computing device 201 may skip occupied frequencies of one or more control channel hopping frequencies while cycling the control channel 221 through the predetermined hopping frequencies.

Once the control channel 221 is discovered, a device 100, 210 may thereafter maintain radio communications with the control channel 221 to continue to receive lists of hopping frequencies from the computing device 201.

Hence, in general, the controller 320 and/or the first communication device 101 and/or the device 100 may initiate communication with the control channel 221 by one or more of: scanning respective frequencies for the control channel 221; determining the respective frequencies at which to scan for the control channel 221; receiving the respective frequencies for the control channel 221 on a beacon; and searching for the control channel 221 at one or more predetermined frequencies.

Furthermore, in examples wherein synchronization indications are transmitted (e.g. using the beacon), and the control channel 221 is cycled through predetermined frequencies, the controller 320 and/or the first communication device 101 and/or the device 100 may search for the control channel 221 based on a synchronization indication, as described above. Indeed, once synchronized, the controller 320 and/or the first communication device 101 and/or the device 100 may receive data on the control channel 221 on one or more of the cycling frequencies, for example a next cycling frequency and/or any of the cycling frequencies (e.g. not necessarily the next cycling frequency).

Regardless, as described hereafter a frequency hopping control command transmitted on the control channel 221 by the computing device 201 may be used to cause the device 100 and/or the devices 210 to frequency hop.

At a block 504, the controller 320 and/or the first communication device 101 and/or the device 100 receives, via the communication unit 302 communicating over the control channel 221, a frequency hopping control command comprising a list of one or more hopping frequencies for frequency hopping.

At a block 506, the controller 320 and/or the first communication device 101 and/or the device 100, in response to receiving the frequency hopping control command, controls the communication unit 302 to communicate via the main radio channels 221 using frequency hopping according to the one or more hopping frequencies.

The frequency hopping command and subsequent frequency hopping is next described.

The frequency hopping control command may include a list of a given number of hopping frequencies through which the main radio channels 220 are to frequency hop. As described above, the frequency hopping control command may further comprise one or more indications of time periods that the main radio channels 220 are to remain on a given hopping frequency before hopping to the next hopping frequency. The one or more indications of time periods may be provided as a schedule. As such, the device 100 may change to a next hopping frequency based on one or more indications of the time periods and/or the schedule.

However, the frequency hopping control command may include any other suitable data including, but not limited to, changes to encryption sequences and/or cryptographic keys for the data transmitted on the main radio channels 220; in these examples, the changes to encryption sequences and/or cryptographic keys may be provided by the controller 320 to the controller 350 for use in decrypting data on the main radio channels 220 (e.g. as the controller 320 may not have access to decoded bits of the data on the main radio channels 220, but the controller 350 may be configured to decode encoded bit of the data on the main radio channels 220 to access the decoded bits).

In yet further examples, the frequency hopping control command may include emergency data, such as emergency instructions (e.g. "DANGER: RUN!" and/or any other suitable emergency instructions in a textual and/or graphical format (and/or aural format and/or haptic format), and the like) which may be provided by the controller 320 to the controller 350 for rendering at the display screen 366 and/or for playing by the speaker 364.

Furthermore, frequency hopping between the devices 100, 210 may be synchronized according to the synchronization indications provided by the beacon. For example, the synchronization indications provided by the beacon may provide a pinpoint time in which the devices 100, 210 are to hop to a next frequency and/or begin a frequency hopping cycle as indicated by the list of hopping frequencies received at the block 504.

Furthermore, the method 500 may include the controller 320 and/or the first communication device 101 and/or the device 100: receiving, via the communication unit 302, a synchronization indication for synchronizing the frequency hopping with respective frequency hopping of other devices 210 communicating via the main radio channels 220. The synchronization indication may be received via the beacon and/or, once communication with the control channel 221 is established, the synchronization indication may be received on the control channel 221.

Furthermore, as described above, the device 100 may comprise: the first communication device 101 comprising the communication unit 302 and the controller 320; and the second communication device 102 comprising the second communication unit 332. As also described above, the first communication device 101 is configured to communicate with a communication network (e.g. the base station 202) via the one more hopping frequencies, and the second communication device 102 is configured to communicate via a fixed frequency band. As also described above, the first communication device 101 may be configured to convert radio communications between the communication network and the second communication device 102 between the one more hopping frequencies and the fixed frequency band. In these examples, the method 500 may further comprise the controller 320 and/or the first communication device 101 and/or the device 100 translating the main radio channels 220 between the one more hopping frequencies and the fixed frequency band via the communication unit 302.

Attention is now directed to FIG. 6, which depicts a flowchart representative of a method 600 for controlling hopping frequencies of devices. The operations of the method 600 of FIG. 6 correspond to machine readable instructions that are executed by the computing device 201, and specifically by the controller 420 of the computing device 201. In the illustrated example, the instructions represented by the blocks of FIG. 6 are stored at the memory 422 for example, as the application 423. The method 600 of FIG. 6 is one way in which the controller 420 and/or the computing device 201 and/or the system 200 may be configured. Furthermore, the following discussion of the method 600 of FIG. 6 will lead to a further understanding of the system 200, and its various components. However, it is to be understood that the method 600 and/or the system 200 may be varied, and need not work exactly as discussed herein in conjunction with each other, and that such variations are within the scope of present examples.

The method 600 of FIG. 6 need not be performed in the exact sequence as shown and likewise various blocks may be performed in parallel rather than in sequence. Accordingly, the elements of method 600 are referred to herein as "blocks" rather than "steps." The method 600 of FIG. 6 may be implemented on variations of the system 200, as well.

At a block 602, the controller 420 and/or the computing device 201 determines a list of one or more hopping frequencies for frequency hopping.

As described above, the controller 420 and/or the computing device 201 may be further configured to determine the list of one or more hopping frequencies for frequency hopping by one or more of: scanning for unused and/or unoccupied frequencies; randomly selecting the one or more hopping frequencies from the unused and/or unoccupied frequencies; using the black list 424 of black-listed frequencies; and using the white list 425 of white-listed frequencies. In some examples, the controller 420 and/or the computing device 201 may receive indications of unused and/or unoccupied frequencies from one or more of the devices 100, 210 which may perform frequency scans to determine unused and/or unoccupied frequencies.

At a block 604, the controller 420 and/or the computing device 201 transmits, via the communication unit 402 communicating over the control channel, to one or more of the communication devices 100, 210, a frequency hopping control command to cause the one or more communication devices 100, 210 to communicate via the main radio channels 220 using frequency hopping according to the one or more hopping frequencies.

In particular, the controller 420 and/or the computing device 201 may be further configured to one or more of: cycle the control channel 221 through one or more control channel hopping frequencies; skip occupied frequencies of the one or more control channel hopping frequencies; and frequency hop the one or more control channel hopping frequencies in accordance with frequency hopping of the main radio channels 220.

In some examples, the method 600 may further comprise, the controller 420 and/or the computing device 201, when the control channel 221 comprises a channel of the main radio channels 220, causing one or more respective hopping frequencies of the control channel to frequency hop with the one or more hopping frequencies of the main radio channels 220.

In some examples, the control channel 221 comprises one or more side channels of the main radio channels 220. In these examples, the method 600 may further comprise, the controller 420 and/or the computing device 201, when the control channel 221 comprises one or more side channels of the main radio channels 220, causing one or more respective hopping frequencies of the control channel 221 to frequency hop one or more of: with the one or more hopping frequencies of the main radio channels 220; and independent from the one or more hopping frequencies of the main radio channels 220 (e.g. as described above).

Attention is next directed to FIG. 7, FIG. 8, FIG. 9 and FIG. 10 which depict examples of the method 500 and the method 600. FIG. 7, FIG. 8, FIG. 9 and FIG. 10 are similar to FIG. 2, with like components having like numbers.

Figure 7:
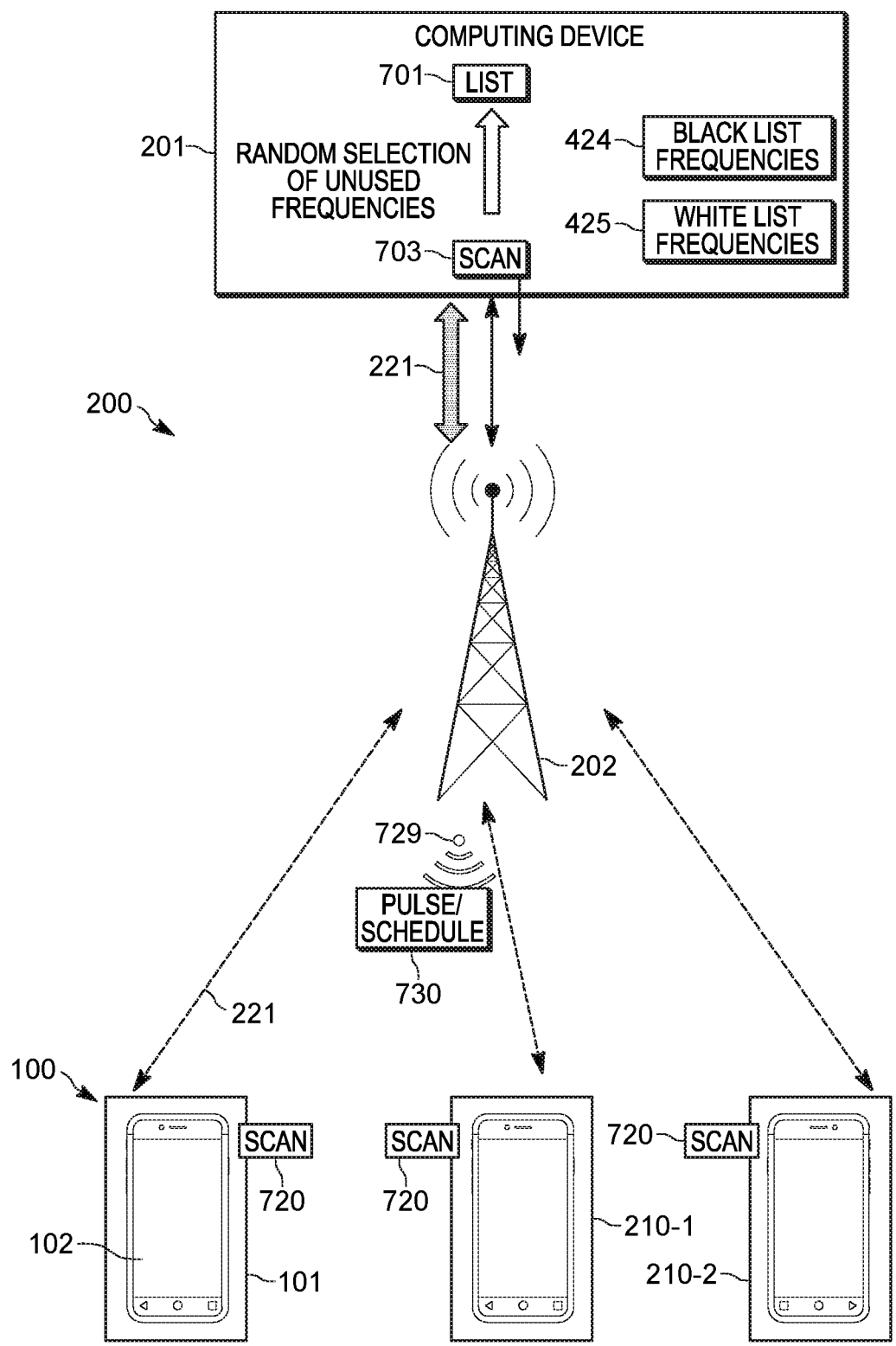
FIG. 7 depicts the system of FIG. 2 implementing a portion of a method for frequency hopping control, in accordance with some examples.

Attention is next directed to FIG. 7 in which frequencies of the main radio channels 220 may not yet be established. However, in the depicted example, the control channel 221 has been established, but the devices 100, 210 have not yet established communication with the control channel 221. The devices 100, 210 have, however, established respective communication links with the base station 202 such that data transmitted by the base station 202 may be received at the devices 100, 210.

As depicted, the computing device 201 is generating a list 701 (e.g. at the block 602 of the method 600) for example by performing a scan 703 through one or more frequency bandwidths, which, as depicted, may be at least partially defined by the lists 424, 425. For example, the scan 703 may be through white-listed frequencies defined by the white list 425 and/or the scan 703 may be through a frequency band on which the first communication device 101 is configured to communicate, excluding black-listed frequencies defined by the black list 425.

As also depicted in FIG. 7, the computing device 201 randomly selects unused frequencies from the scan 703 to generate the list 701. The list 701 may include a given number of unused frequencies, and a schedule for frequency hopping therebetween.

As also depicted in FIG. 7, the devices 100, 210 perform respective scans 720 to search for the control channel 221 to initiate (e.g. at the block 502 of the method 500) communication with the control channel 221. As depicted, the scans 720 may be assisted by the computing device 201 controlling the base station 202 to broadcast, on a beacon 729, a synchronization pulse and/or schedule 730 for frequency hopping and/or rotating and/or cycling of frequencies of the control channel 221. The scans 720 may hence include receiving the synchronization pulse and/or schedule 730 broadcast via the beacon 729.

Figure 8:
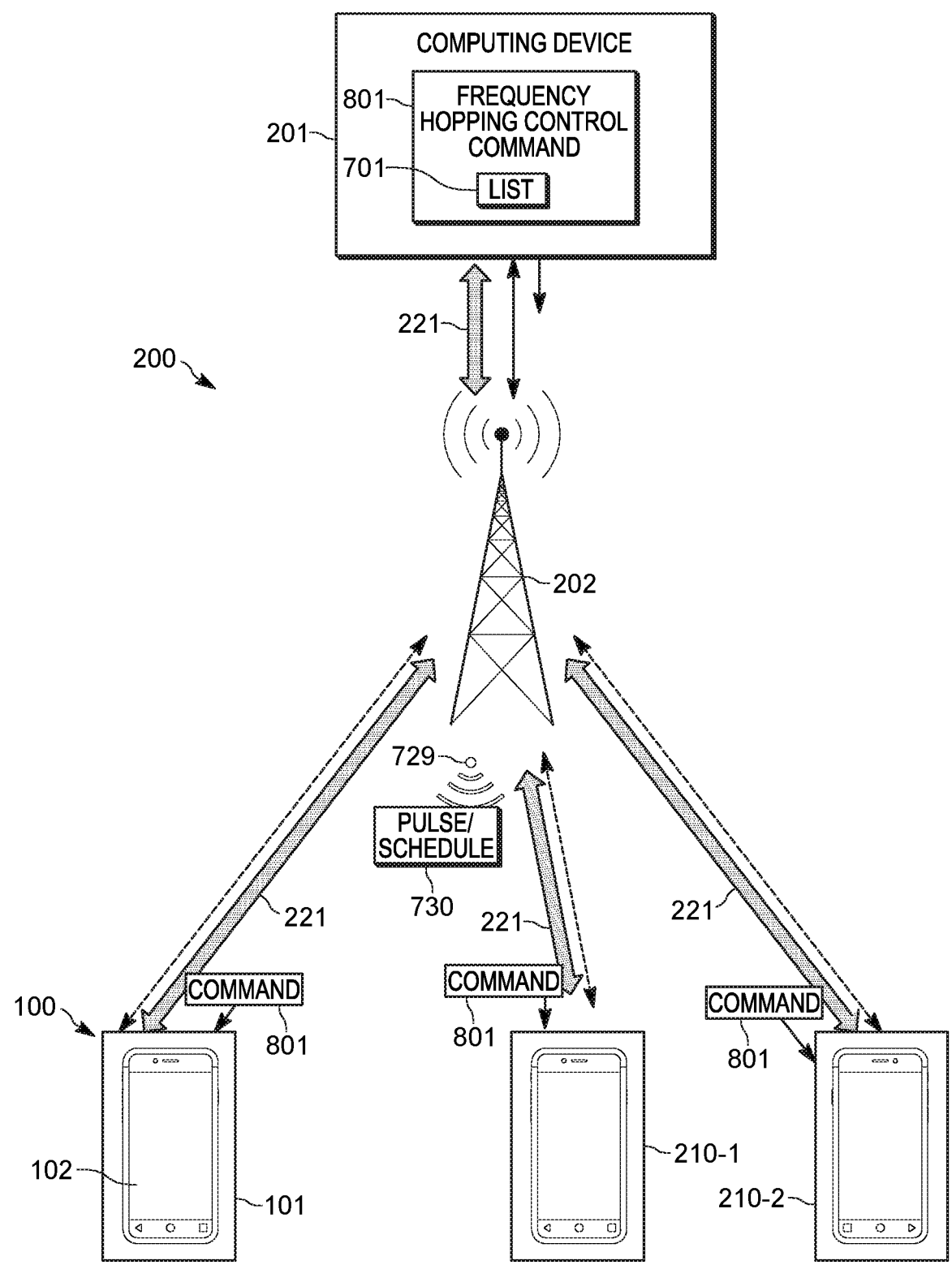
FIG. 8 depicts the system of FIG. 2 continuing implementation of the method for frequency hopping control, in accordance with some examples.

Attention is next directed to FIG. 8, in which the devices 100, 210 have initiated communication the control channel 221. In FIG. 8, the computing device 201 has generated a frequency hopping control command 801 that includes the list 701, and is transmitting (e.g. at the block 604 of the method 600) the frequency hopping control command 801 over the control channel 221. As also depicted in FIG. 8, the devices 100, 210 receive (e.g. at the block 504 of the method 500), frequency hopping control command 801 over the control channel 221.

As depicted, the base station 202 may continue to broadcast the beacon 729 the synchronization pulse and/or the schedule 730 via the beacon 729. In other examples, the synchronization pulse and/or the schedule 730 may be encoded and/or included on the control channel 221 and/or transmitted on the control channel 221, in addition to, or in place of the beacon 729. In general, the beacon 729 may be referred to as a simplified version of the control channel 221, the beacon 729 transmitting only certain information which may include, but is not limited to, a current hopping frequency and/or a next hopping frequency for the control channel 221.

Figure 9:
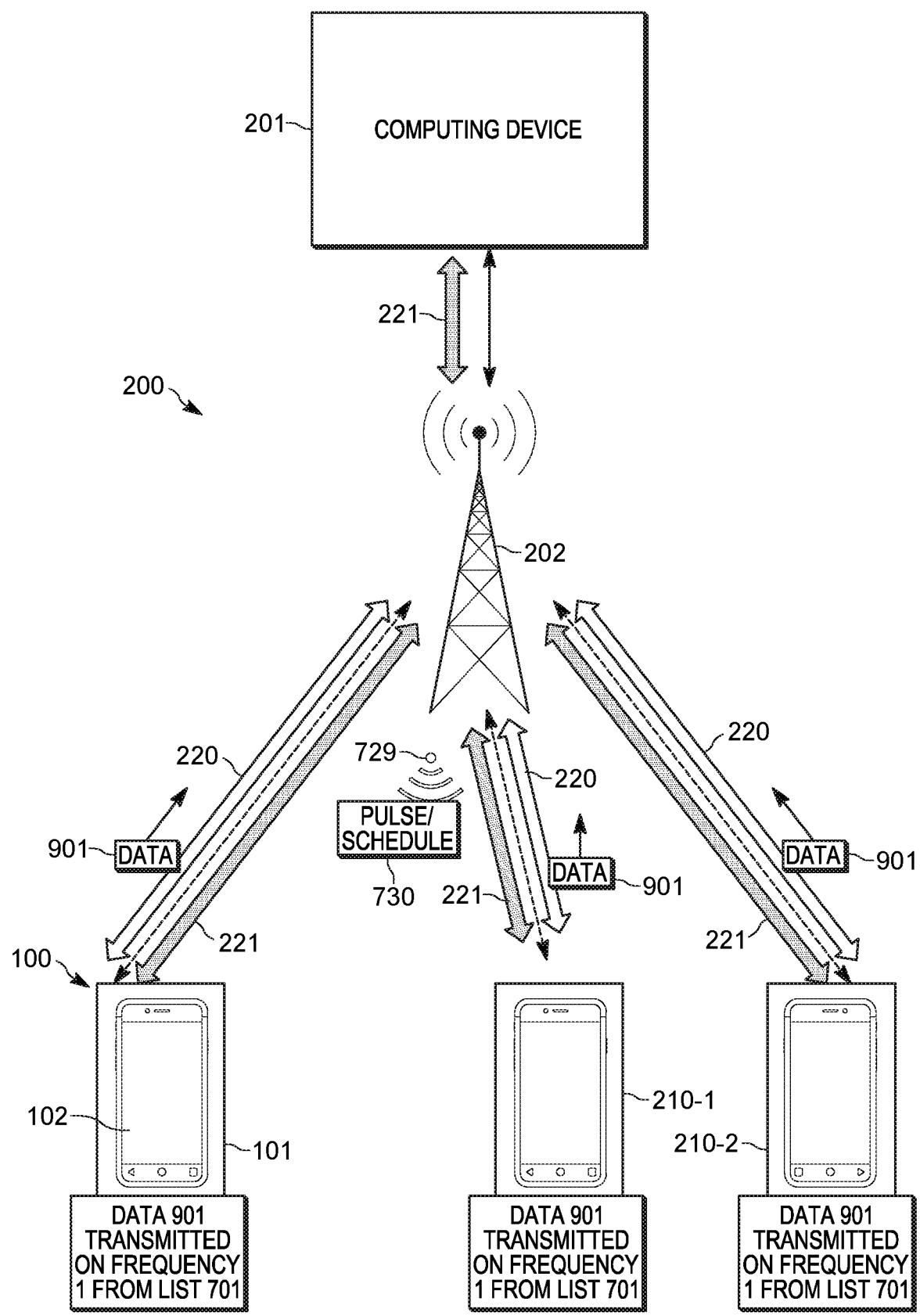
FIG. 9 depicts the system of FIG. 2 further continuing implementation of the method for frequency hopping control, in accordance with some examples.

Attention is next directed to FIG. 9 in which the devices 100, 210, having received the frequency hopping control command 801 and the list 701, and are communicating (e.g. at the block 506 of the method 500) via the main radio channels 220, for example by transmitting respective data 901 to each other over the main radio channels 220. The data 901 may comprise audio, video, messages and/or any other suitable data. Furthermore, as depicted, the data 901 is transmitted on a first frequency (e.g. "Frequency 1" from the list 701). As depicted, the base station 202 may continue to broadcast the beacon 729 the synchronization pulse and/or schedule 730 broadcast via the beacon 729.

Figure 10:
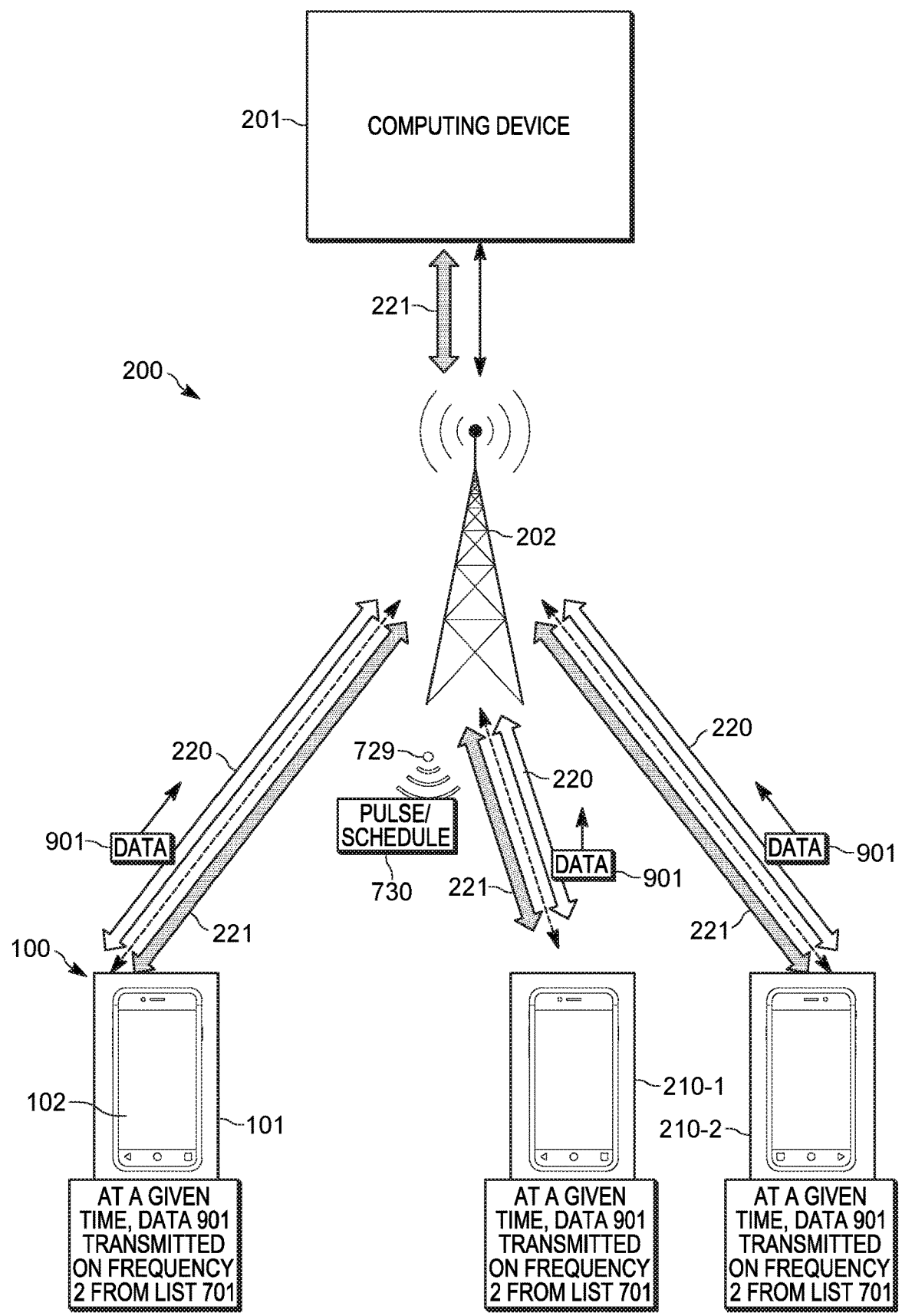
FIG. 10 depicts the system of FIG. 2 further continuing implementation of the method for frequency hopping control, in accordance with some examples.

Attention is next directed to FIG. 10 in which the devices 100, 210, synchronously change from transmitting the data 901 on the first frequency to transmitting the data 901 on a second frequency (e.g. "Frequency 2" from the list 701). The synchronous change in frequencies may be coordinated via the synchronization pulse and/or schedule 730 of the beacon 729.

While not depicted, it is understood that the computing device 201 may continue to generate lists of hopping frequencies and transmit the lists to the devices 100, 210 on the control channel 221 such that when the devices 100, 210 change to the last hopping frequency of the list 701, the devices 100, 210 may change to a first hopping frequency of a next list. Indeed, the computing device 201 may update and/or periodically update and/or continually update (e.g. and transmit) lists of hopping frequencies such that an expired hopping frequency (e.g. a previously used frequency) rolls off a front of a list and a new hopping frequency is added to a tail of the list, such that a given number of next hopping frequencies is always on the list; the list as it is updated, is transmitted to the devices 100, 210. Such a scheme may enable the devices 100, 210 to have and/or always have a list of a given number of next hopping frequencies in case a device 100, 210 temporarily loses communication with the control channel 221.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A device comprising:
   a communication unit configured to communicate with one or more communication devices via at least a control channel, the one or more communication devices communicating via main radio channels; and
   a controller interconnected with the communication unit, the controller configured to:
      generate a list of one or more hopping frequencies for frequency hopping by: scanning for unused frequencies, using the communication unit, the unused frequencies comprising one or more of open frequencies and unoccupied frequencies on which, during the scanning by the communication unit, data is not being transmitted by devices, other than the device and the one or more communication devices; and selecting the one or more hopping frequencies from the unused frequencies to generate the list of the one or more hopping frequencies; and
      transmit, via the communication unit communicating over the control channel, to one or more of the communication devices, a frequency hopping control command to cause the one or more communication devices to communicate via the main radio channels using frequency hopping according to the one or more hopping frequencies.

2. The device of claim 1, wherein the control channel comprises one or more of:
   a channel of the main radio channels; and
   one or more side channels of the main radio channels.

3. The device of claim 1, wherein the controller is further configured to:
   when the control channel comprises a channel of the main radio channels, cause one or more respective hopping frequencies of the control channel to frequency hop with the one or more hopping frequencies of the main radio channels; and
   when the control channel comprises one or more side channels of the main radio channels, cause one or more respective hopping frequencies of the control channel to frequency hop one or more of: with the one or more hopping frequencies of the main radio channels; and independent from the one or more hopping frequencies of the main radio channels.

4. The device of claim 1, wherein the controller is further configured to one or more of:
   cycle the control channel through one or more control channel hopping frequencies;
   skip occupied frequencies of the one or more control channel hopping frequencies; and
   frequency hop the one or more control channel hopping frequencies in accordance with frequency hopping of the main radio channels.

5. The device of claim 1, wherein the controller is further configured to generate the list of one or more hopping frequencies for frequency hopping by one or more of:
   using a black list of black-listed frequencies; and
   using a white list of white-listed frequencies.

6. A method comprising:
   generating, at a computing device, a list of one or more hopping frequencies for frequency hopping by: scanning for unused frequencies, using a communication unit, the unused frequencies comprising one or more of open frequencies and unoccupied frequencies;
   and selecting the one or more hopping frequencies from the unused frequencies to generate the list of the one or more hopping frequencies; and transmitting, by the computing device communicating over the control channel, to one or more communication devices, a frequency hopping control command to cause the one or more communication devices to communicate via the main radio channels using frequency hopping according to the one or more hopping frequencies, wherein the one or more of the open frequencies and the unoccupied frequencies comprises frequencies on which, during the scanning by the communication unit, data is not being transmitted by devices, other than the computing device and the one or more communication devices.

7. The method of claim 6, wherein the control channel comprises one or more of:
a channel of the main radio channels; and
one or more side channels of the main radio channels.

8. The method of claim 6, further comprising:
when the control channel comprises a channel of the main radio channels, causing one or more respective hopping frequencies of the control channel to frequency hop with the one or more hopping frequencies of the main radio channels; and
when the control channel comprises one or more side channels of the main radio channels, causing one or more respective hopping frequencies of the control channel to frequency hop one or more of: with the one or more hopping frequencies of the main radio channels; and independent from the one or more hopping frequencies of the main radio channels.

9. The method of claim 6, further comprising one or more of:
cycling the control channel through one or more control channel hopping frequencies;
skipping occupied frequencies of the one or more control channel hopping frequencies; and
frequency hopping the one or more control channel hopping frequencies in accordance with frequency hopping of the main radio channels.

10. The method of claim 6, wherein generating the list of one or more hopping frequencies for frequency hopping further occurs by one or more of:
using a black list of black-listed frequencies; and
using a white list of white-listed frequencies.

11. The device of claim 1, wherein the controller is further configured to determine the list of the one or more hopping frequencies for frequency hopping by: randomly selecting the one or more hopping frequencies from the unused frequencies.

12. The method of claim 6, further comprising determining the list of the one or more hopping frequencies for frequency hopping by: randomly selecting the one or more hopping frequencies from the unused frequencies.

13. The device of claim 1, wherein the controller is further configured to: control a base station to broadcast, on a beacon, one or more of a synchronization pulse and schedule for one or more of frequency hopping, rotating and cycling of the one or more hopping frequencies transmitted on the control channel.

14. The method of claim 6, further comprising controlling a base station to broadcast, on a beacon, one or more of a synchronization pulse and schedule for one or more of frequency hopping, rotating and cycling of the one or more hopping frequencies transmitted on the control channel.

15. The device of claim 1, wherein the controller is further configured to scan for the unused frequencies by scanning a range of frequencies to search for the unused frequencies, the range of frequencies excluding commercial frequency bands.

16. The method of claim 6, wherein scanning for the unused frequencies comprises scanning a range of frequencies to search for the unused frequencies, the range of frequencies excluding commercial frequency bands.

\* \* \* \* \*